Nov. 10, 1959 R. A. BOYER 2,911,741
SELF-SCORING TEACHING APPARATUS
Filed Dec. 24, 1957 3 Sheets-Sheet 1

INVENTOR
*Roscoe A. Boyer*

BY
ATTORNEYS

Nov. 10, 1959     R. A. BOYER     2,911,741
SELF-SCORING TEACHING APPARATUS
Filed Dec. 24, 1957     3 Sheets-Sheet 2
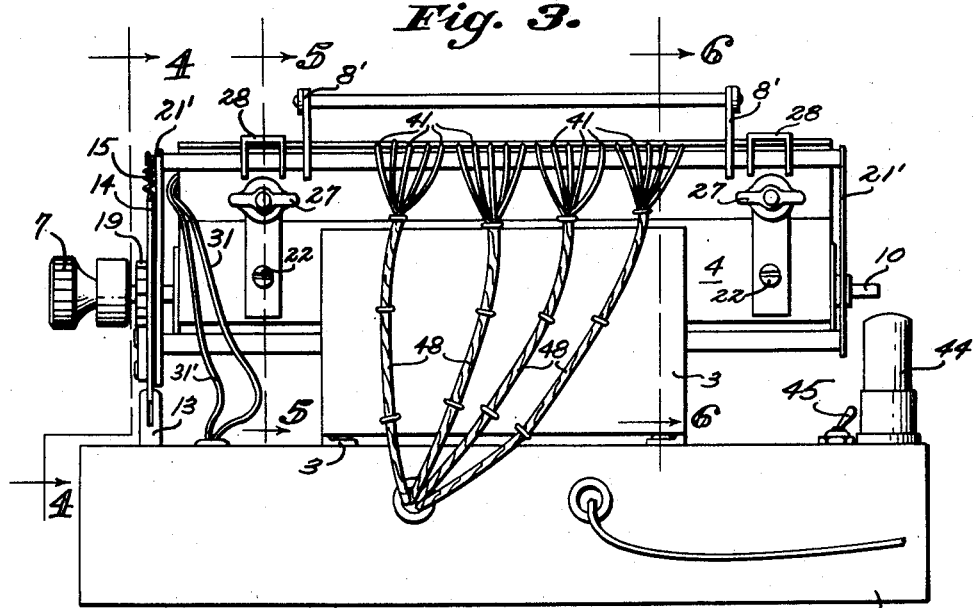
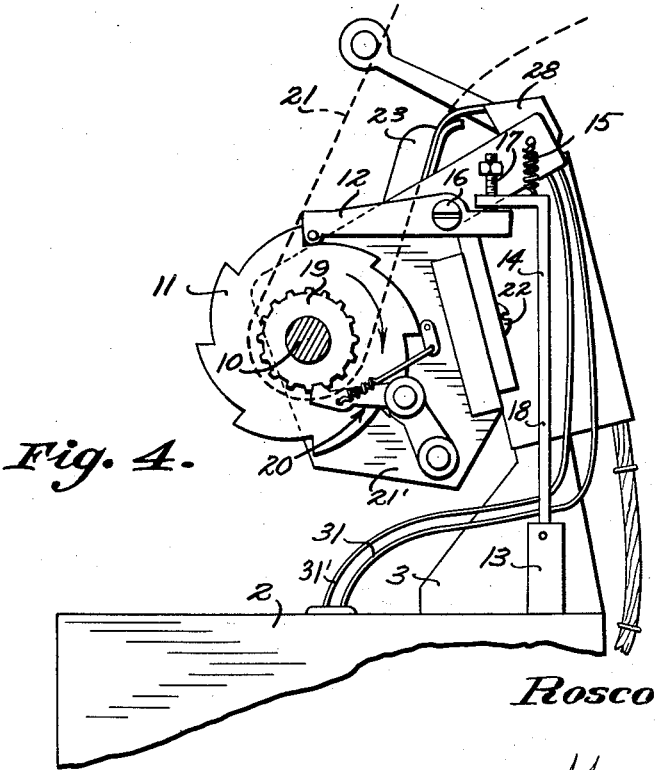
INVENTOR
Roscoe A. Boyer Nov. 10, 1959    R. A. BOYER    2,911,741
SELF-SCORING TEACHING APPARATUS
Filed Dec. 24, 1957    3 Sheets-Sheet 3

INVENTOR
Roscoe A. Boyer
BY
ATTORNEYS

United States Patent Office 2,911,741
Patented Nov. 10, 1959

2,911,741

SELF-SCORING TEACHING APPARATUS

Roscoe A. Boyer, Oxford, Miss.

Application December 24, 1957, Serial No. 704,973

4 Claims. (Cl. 35—9)

The present invention relates to a self-scoring teaching aid and more particularly to an electro-mechanical apparatus embodying features of construction which permit the practical application in a teaching aid of the principle that the last act in a behavioral sequence is most likely to be remembered. If the last act in such a sequence is a correct one, the employment of the instant apparatus will encourage and aid in remembering only correct responses. The present device also insures that this principle will be applied by incorporating construction features which permit advancing from one question to another only if the correct answer has been found for the preceding question. In this regard the instant device is unique in that teaching aides of this general type presently employed are not constructed to operate on this principle. They indicate only that the last act in a sequence may be either right or wrong or are merely testing devices which incorporate features to limit the time for response to questions and for grading the answers.

It is therefore a principal object of the instant invention to provide a teaching aid which has an inherent features the rewarding of correct answers and thus aid in remembering correct answers and punishment for incorrect answers in that the device cannot be advanced to the next question until a correct answer is given.

It is a further object of the instant invention to provide a teaching aid which permits use of a tape which may contain both questions and answers and which is interchangeable and may be locally constructed to permit the teacher to provide his own questions and answers thus facilitating the use of the device for various grade or intelligence levels.

It is a further object of the instant invention to provide a teaching aid which may be controlled to permit acceptance of a specific range of answers as correct or provide for a range of responses to incorporate both multiple choice items of specific solutions.

It is a further object of the instant invention to provide a teaching aid which will afford an indication of the number of attempts to arrive at a correct solution of a problem.

It is another object of the present invention to provide a teaching aid wherein the response mechanism for answering questions presented by the tape through a viewing window on the apparatus may be varied to contain various symbols such as letters, numbers or other indicia.

It is another object of the present invention to provide a teaching aid which is of rugged construction and simple to operate.

These and other objects and advantages of the device will become apparent from the following description in which:

Fig. 3 is a rear elevational view of the device with the cover removed;

Fig. 4 is a view taken on the line 4—4 of Fig. 3;

Figure 1:
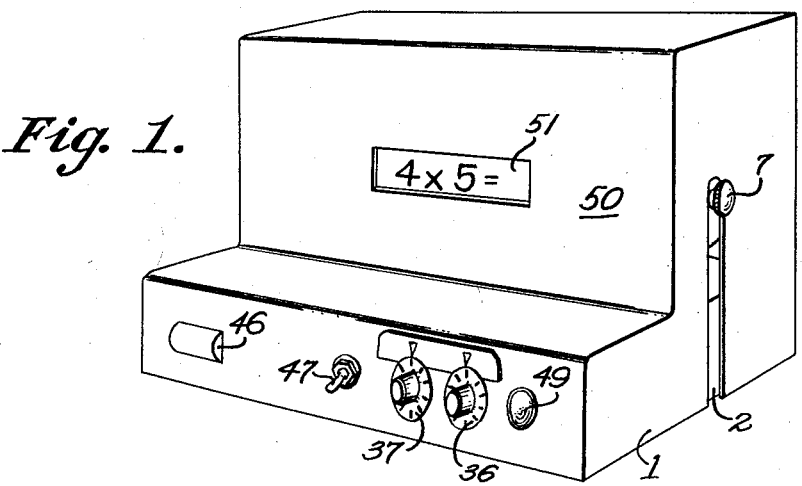
Fig. 1 is a perspective view of the device with the cover in place.
Figure 2:
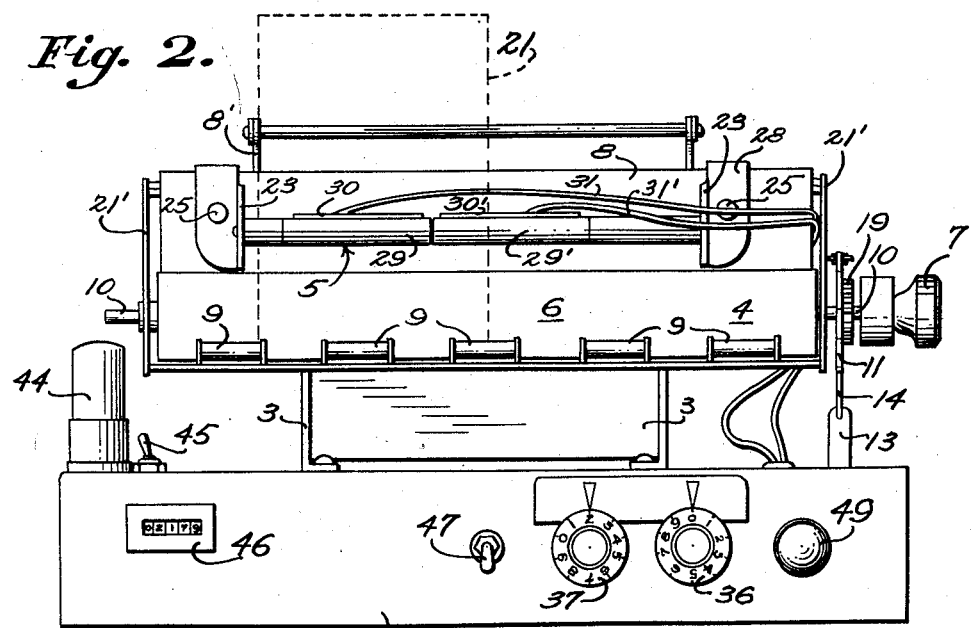
Fig. 2 is a front elevational view of the device with the cover removed.
Figures 5, 6:
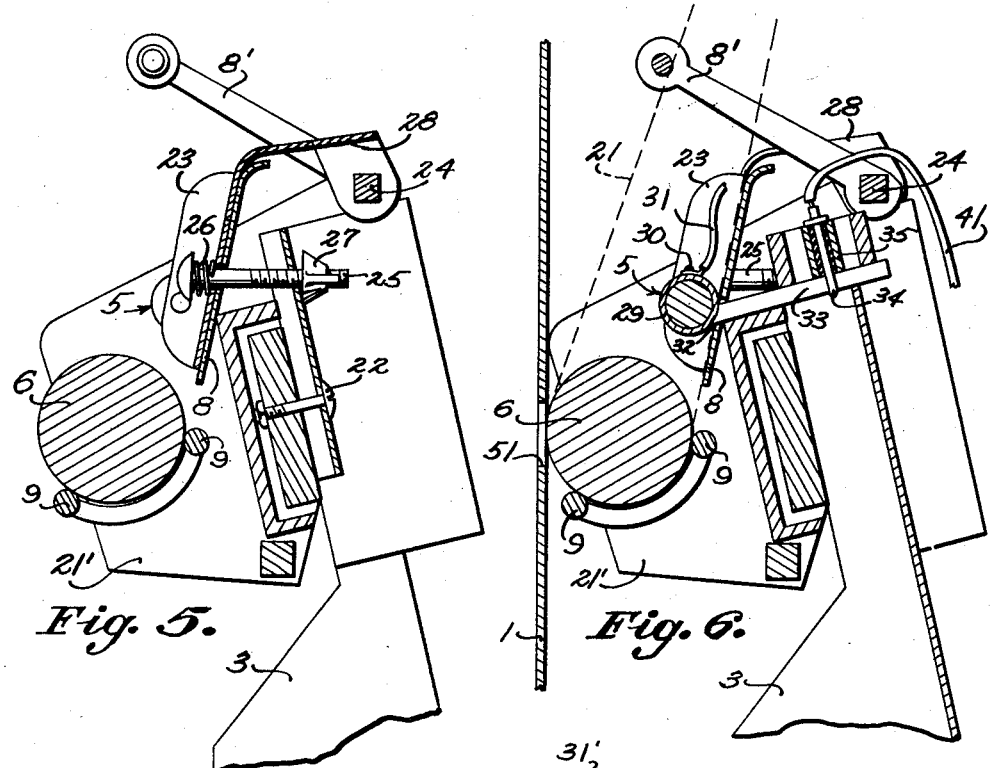
Fig. 5 is a view taken on the line 5—5 of Fig. 3.
Fig. 6 is a view taken on the line 6—6 of Fig. 3.

Reference is now made to Fig. 2 which is a front view of the apparatus with the cover 1 removed. A base or chassis 2 carries a bracket 3 which supports a carriage mechanism shown generally by 4, similar to a conventional typewriter or adding machine, including a pick-up roller 5, platen 6, platen control knob 7, guide plate 8, tape guide 8' and platen support rollers 9. Attached to one end of the shaft 10 carrying the platen 6 is a ratchet wheel 11 as shown in Fig. 4, which is permitted to rotate in a clockwise direction when a pawl 12 is moved out of engagement with the ratchet wheel 11 upon energization of the solenoid 13 which causes linkage member 14 to be drawn downward against the tension of spring 15. Pawl 12 is supported for rotation by bolt 16 and the pawl 12 is returned by gravity to a position of engagement with the ratchet wheel 11 as linkage member 14 is restored to its initial position by spring 15. Adjustment of the pawl 12 for proper engagement with the ratchet wheel 11 is accomplished by a bolt 17 threadably received in the upper end of the linkage member 14 for vertical travel. The solenoid 13 may be mounted above or below the base or chassis 2 and connected to the linkage member 14 through the solenoid plunger 18 or alternatively the solenoid plunger may be of sufficient length to also serve as the linkage member 14. Mounted on the shaft 10 adjacent the ratchet wheel 11 is a gear 19 which is prevented from being rotated counter-clockwise by a spring biased dog linkage shown generally by 20. Such counter-clockwise rotation is desired to prevent a tape 21, to be described hereinafter, from being turned to a previous position during operation of the device. Abutment plates 21', located adjacent opposite ends of the platen 6, are secured to the platen carrying structure by bolts 22 as shown in Fig. 5. Supports 28 pivotally mounted as at 24, best shown in Fig. 5, are provided with flanges 23 projecting normally of the guide plate 8 to provide a support for an electrically conducting pick-up roller 5 for a purpose to be hereinafter described. The pressure of the pick-up roller against the guide plate 8 may be adjusted by tension bolts 25 carrying springs 26 and passing through the supports 28, and guide plate 8 as shown in Fig. 5. The tension desired is adjusted by means of wing nuts 27 carried by the bolts 25. The pick-up roller 5 may be of electrical conducting material or insulating material as a core surrounded by metallic cylinders 29 and 29' as shown, upon which contactors 30 and 30', respectively, ride. Electrical conductors 31 connected to the contactors 30 and 30', respectively, connect the pick-up roller 5 to the electrical circuit to be hereinafter described. The guide plate 8 is provided with apertures or a continuous slot 32 with sufficient clearance to permit the passage therethrough of brushes 33 and 33' which make electrical contact with the metallic cylinders 29 and 29' of the pick-up roller. The brushes 33 and 33' are insulated from each other and from the guide plate 8 and are connected with terminals 34 and 34', respectively, carried in a terminal box 35 mounted on the platen support structure, Fig. 6. In the particular embodiment shown in the illustrations, which include two response switches 36 and 37, having contact arms 36' and 37', respectively, a total of twenty brushes are used. Response switch 36, for example, may represent the units place in a mathematical problem answer and response switch 37 may represent the tens place in the problem answer, cylinders 29 and 29' are separately energized through contactors 30 and 30' to permit contact of the brushes 33, 33' with the cylinders 29 or 29', respectively, on the pick-up roller through either the tens or units perforations 40 or 40', respectively, in the tape 21. Alternatively, the metallic cylinder 29 and 29' could be a single cylinder energized by a single contactor similar to the contactors 30 and 30'. Each of the brushes 33 and 33' has a separate conductor 41 connected to one of the contacts 39 and 39' of the response switches 36 and 37, respectively, i.e. ten of the conductors 41 will be connected to the terminals or contacts 39 of response switch 36 and ten of the conductors 41 will be connected to the terminals or contacts 39' of response switch 37. The response switches 36 and 37 are mounted on the front panel of the base or chassis 2 in a manner to permit access when the cover 1 is in place on the apparatus.

Mounted on the horizontal portion of the chassis 2 are an instantaneous and delay relay 42 and 43, respectively, housed within an envelope 44 as a unit and adapted to be plugged in to a cooperating socket. A single pole double throw switch 45 is mounted next the relays 42, 43 for the selective control of the relays for a purpose to be described later. The relays 42, 43 and the switch 45 are internally of the cover 1 when it is in place on the chassis 2. The front panel of the chassis also has mounted thereon a counter 46, a switch 47 and an indicating light 49. The front face 50 of the cover 1 has a central window 51 through which the problems appearing on the tape 21 may be viewed by the operator.

Figure 8:
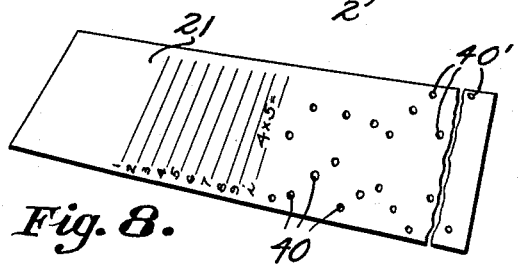
Fig. 8 is a fragmented perspective view of the tape 21 illustrating the arrangement of the questions and that of the perforations.

Reference is now made to Fig. 8 showing a tape 21 for use in connection with the apparatus. The upper portion of the tape 21 contains a space on which the questions which will appear in the window 51 may be printed or written and the lower portion of the tape 21 contains a space which may be divided into two vertically disposed corresponding, for example, to the units and tens places or other groupings. These areas are perforated in a predetermined manner so that when the tape 21 is in place in the apparatus the perforations are aligned for registering position with the brushes 33 and 33' and in vertical position to correspond to the questions appearing in the upper portion of the tape. With this arrangement, when a question on the upper portion of the tape appears in the window 51 of the apparatus, the perforations are in registry with the brushes 33 and 33' so that upon proper operation of the response switches 36 and 37 an electrical circuit is completed through the brush or brushes associated with the positions selected on the response switches 36 and 37 and the metallic cylinders 29, 29' on the pick-up roller. If the response switches 36 and 37 have been adjusted to the position corresponding to the correct answer to the question appearing in the window 51, the indicating light 49 will be energized and the solenoid 13 will be energized, as will be explained hereinafter in the description of the electrical circuit in Fig. 7, to permit the apparatus to be advanced to the next question through operation of the ratchet wheel 11 and pawl 12. It is to be understood that the tape 21 may be arranged so that the questions appear on the right hand side of the tape and the perforations on the left hand side. It is also obvious that the tape may be of indefinite length. In the instant apparatus the tape is advanced by friction action as in the ordinary typewriter but it is also possible that the platen structure may be provided with cogs which engage perforations in the marginal edges of the tape to advance the tape. This latter arrangement prevents the tape from being askewed while being moved through the apparatus.

Figure 7:
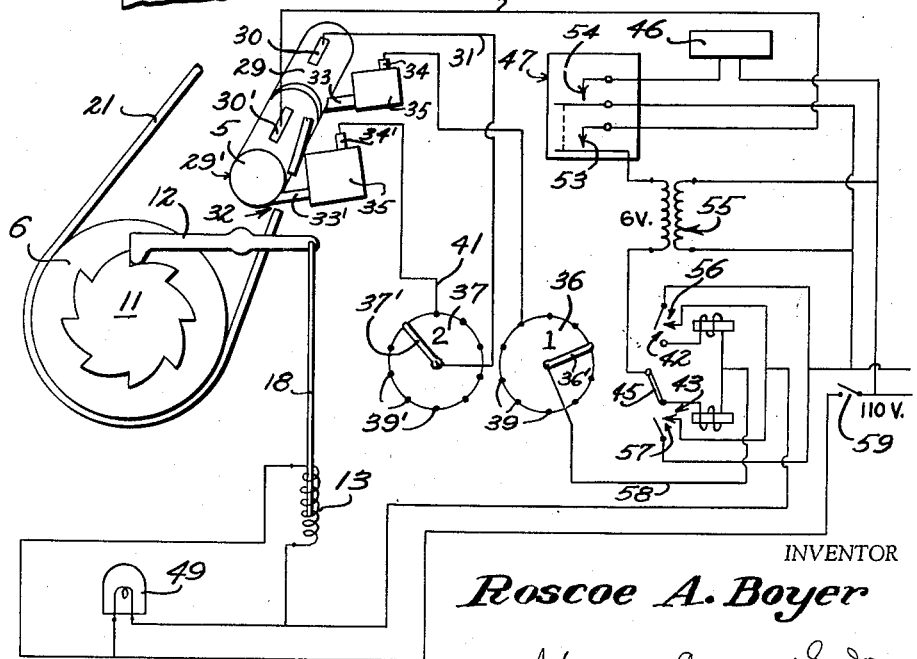
Fig. 7 is a wiring diagram illustrating the manner in which the response switches, upon proper manipulation, permit rotation of the tape feed mechanism and a visual indication that the correct answer has been chosen.

Reference is now made to Fig. 7 showing the electrical diagram of the apparatus. It has previously been explained that when the response switches 36 and 37 have been rotated or adjusted to positions corresponding to the correct answer to the question appearing in the window of the apparatus a circuit is completed through a brush 33, 33' or both projecting through a perforation or perforations in the tape 21 establishing a continuous circuit through the metallic cylinders 29, 29' on the pick-up roller 5. Under these circumstances, it can be seen from the diagram that upon operation of the momentary type switch 47 to close contacts 53 and 54 a circuit is completed through the secondary of the step-down transformer 55 and through either the instantaneous or delay relay 42, 43 respectively, depending on the position of the switch 45. Each operation of the switch 47 also completes a circuit through the counter 46. An indication is thus given to show the number of attempts made to obtain the correct answer for a particular problem or question. When a circuit is completed through the winding of the relays 42 or 43, contact 56 or 57, respectively, are closed causing energization of the indicating lamp 49 and solenoid 13. The operation of the solenoid 13 permits the ratchet wheel 11 to be advanced through release of the pawl 12. It is to be understood that the pawl 12 and ratchet wheel 11 may be arranged for automatic advancement upon energization of the solenoid 13. As indicated in the electrical diagram, the response switches 36 and 37 are serially connected thereby requiring the response switches to be in the correct positions in order for the circuit to be completed. Therefore to permit the units response switch 36 only to actuate the electrical circuitry, when the required answer is within the range of this switch alone, it will be necessary to perforate the tape so that such answers will also require that response switch 37 be in the zero position in order that the electrical circuit may be continuous. A switch 59 controls the energizing source through conductors 48 to the entire apparatus.

In operation therefor the operator views the problem through the window 51 and, assuming that switch 59 and relay selector switch 45 have been thrown to the proper position, rotates the response switches 36 and 37 to the positions yielding the correct answer to the problem and manupulates the momentary contact type switch 47. If the answer determined by the position of the response switches is correct, the indicating light 49 will light up and the solenoid 13 will permit the advancement of the apparatus to the next question. The counter will register that the momentary contact switch has been manipulated. If the answer is incorrect the light will not come on and the ratchet wheel 11 will remain locked preventing the tape 21 from being advanced to the next question but the counter will score an attempt to obtain the answer.

While a specific embodiment of the apparatus has been described, it will be understood that various modifications may be made without departing from the scope of the invention.

Having described my invention what I desire to claim and secure by United States Letters Patent is:

1. A self-scoring teaching apparatus comprising, in combination with a tape means having questions thereon and perforations arranged in predetermined locations corresponding to correct answers to the questions and sequentially relative to said questions, carriage means for receiving and governing the advance of said tape means, electrically conductive roller means mounted on said carriage means, apertured guide means for directing said tape means into said carriage means and spaced from said electrically conductive roller means to permit the passage of said tape means therebetween, a plurality of contact means mounted on said carriage means projectable through said apertured guide means for contacting said electrically conductive roller means, tensioning means for adjusting and maintaining the spacing between said apertured guide means and said electrically conductive roller means, window means on said apparatus for viewing the questions on said tape means as it advances through said carriage means, serially connected switch means having a plurality of terminals thereon, each of said plurality of contact means connected in predetermined order to said terminals for selectively connecting said contact means to an energizing source, momentary switch means inter-connecting said electrically conductive roller means and said energizing source, electro-mechanical means coacting with said carriage means for progressively advancing said carriage means and said tape means, indicating means connected in series with a circuit interrupting means to said energizing source, scoring means connected to said momentary switch means, said momentary switch means establishing continuous electrical circuit connection through said contact means and said electrically conductive roller means when said perforations are in registry with said contact means and said serially connected switch means are adjusted to positions corresponding to correct answers to the questions on said tape appearing in said window means, the establishment of a continuous circuit actuating said electro-mechanical means, said indicating means and said scoring means.

2. A self-scoring teaching apparatus comprising, in combination with a tape means having questions thereon and perforations arranged in predetermined locations corresponding to correct answers to the questions and sequentially relative to the questions, carriage means for receiving and governing the advance of said tape means, ratchet means on said carriage means, solenoid actuated linkage means engaging said ratchet means for controlling the rotational movement of said carriage means, electrically conductive roller means mounted on said carriage means, apertured guide means for directing said tape means into said carriage means and spaced from said electrically conductive roller means to permit passage of said tape means therebetween, a plurality of contact fingers mounted on said carriage means projectable through said apertured guide means for contacting said electrically conductive roller means, tensioning means for adjusting and maintaining the spacing between said apertured guide means and said electrically conductive roller means, window means on said apparatus for viewing the questions on said tape means as it advances through said carriage means, serially connected rotary switch means having a plurality of terminals thereon, each of said plurality of contact means connected in predetermined order to said terminals for selectively connecting said contact means to an energizing source, momentary switch means interconnecting said electrically conductive roller means and said energizing source, indicating means connected in series with a circuit interrupting means to said energizing source, scoring means connected to said momentary switch means, said momentary switch means establishing continuous electrical circuit connection through said contact means and said electrically conductive roller means when said perforations are in registry with said contact means and said serially connected rotary switch means are adjusted to positions corresponding to correct answers to the questions on said tape means appearing in said window means, the establishment of a continuous electrical circuit actuating said indicating means, said scoring means and said solenoid actuated linkage means to advance said carriage means to rotate said tape means to a succeeding question responsive to adjusting said rotary switch means to positions corresponding to the correct answers to the questions on said tape means.

3. Apparatus as recited in claim 2 wherein said circuit interrupting means comprises serially connected electromagnetic contactors, each of said serially connected electro-magnetic contactors having a predetermined time delay and switch means for selectively connecting one of said serially connected electro-magnetic contactors to said energizing source.

4. Apparatus as recited in claim 2 wherein said scoring means comprises an electrically actuated numerical counter mechanism cumulatively tabulating operations of said momentary switch means.

References Cited in the file of this patent

UNITED STATES PATENTS

| | | |
|---|---|---|
| 1,670,480 | Pressey | May 22, 1928 |
| 2,030,175 | LeFevre | Feb. 11, 1936 |
| 2,402,162 | Holt | June 18, 1946 |